United States Patent

[11] 3,610,676

[72] Inventor Hans Richner
 Basle, Switzerland
[21] Appl. No. 789,332
[22] Filed Jan. 6, 1969
[45] Patented Oct. 5, 1971
[73] Assignee F.B. Hatebur A.G.
 Basel, Switzerland
[32] Priority Jan. 9, 1968
[33] Netherlands
[31] 68.00308

[54] WORKPIECE TRANSPORT DEVICE
 7 Claims, 4 Drawing Figs.
[52] U.S. Cl. .................................................. 294/116,
 214/1 BB, 294/118
[51] Int. Cl. .................................................. B66c 1/00
[50] Field of Search ........................................... 294/95,
 116, 118; 198/232; 214/1 BZ

[56] References Cited
UNITED STATES PATENTS

| | | | |
|---|---|---|---|
| 3,371,780 | 3/1968 | Clark | 214/1 BZ |
| 2,374,326 | 4/1945 | Bourland | 198/232 |
| 2,927,679 | 3/1960 | Rively | 198/210 |

Primary Examiner—Richard E. Aegerter
Assistant Examiner—Douglas D. Watts
Attorney—Kurt Kelman ABSTRACT: The specification discloses a workpiece-handling device, preferably in a multistage die press, and comprising a gripper device connected to a drive arrangement by way of a pair of resiliently interconnected levers, so that obstruction of the gripper device effects separation of the levers and tripping of a switch which will require positive resetting before normal operation can be resumed.

INVENTOR.
HANS RICHNER

BY [signature]

AGENT

*INVENTOR.*
HANS RICHNER

BY

AGENT 3,610,676

WORKPIECE TRANSPORT DEVICE

The invention submitted concerns a workpiece transport device and in a particularly advantageous form the invention relates to a device for the motion control of transverse transport pincers on multiple-stage presses.

With workpiece-handling devices such as automatic transverse transport multistage die presses, each workpiece may be formed into the required shape by several operations, as for example in four consecutive forming operations. Pincer devices are generally used for the transverse transport of the workpiece from one shaping stage to the next, each workpiece being thereby seized immediately after each shaping operation by a pincer or gripper and being transported to the next shaping stage where a new die or other shaping device processes the workpiece.

Experience shows that undesirable incidents frequently occur in transverse transport of pressed articles whereby the participating machine elements, because of the high forces arising out of an obstruction, may be seriously damaged or even destroyed.

According to the invention we provide a workpiece transport device comprising a gripper device, two pivotable levers one of which is mechanically connected to the gripper device and another is connected to a drive member, spring means connecting the levers for joint pivoting movement, and means responsive to relative angular movement between said pivotable levers for causing cessation of the operation of said workpiece transport device and/or a machine associated therewith.

Preferably the movement responsive means comprise cooperating normally contacting abutment surfaces on the levers, one of said abutment surfaces being arranged to operated a switch when the levers move away from the normal orientation.

In order that the present invention may more readily be understood, the following description is given, merely by way of example, reference being made to the accompanying drawings wherein.

Figure 1:
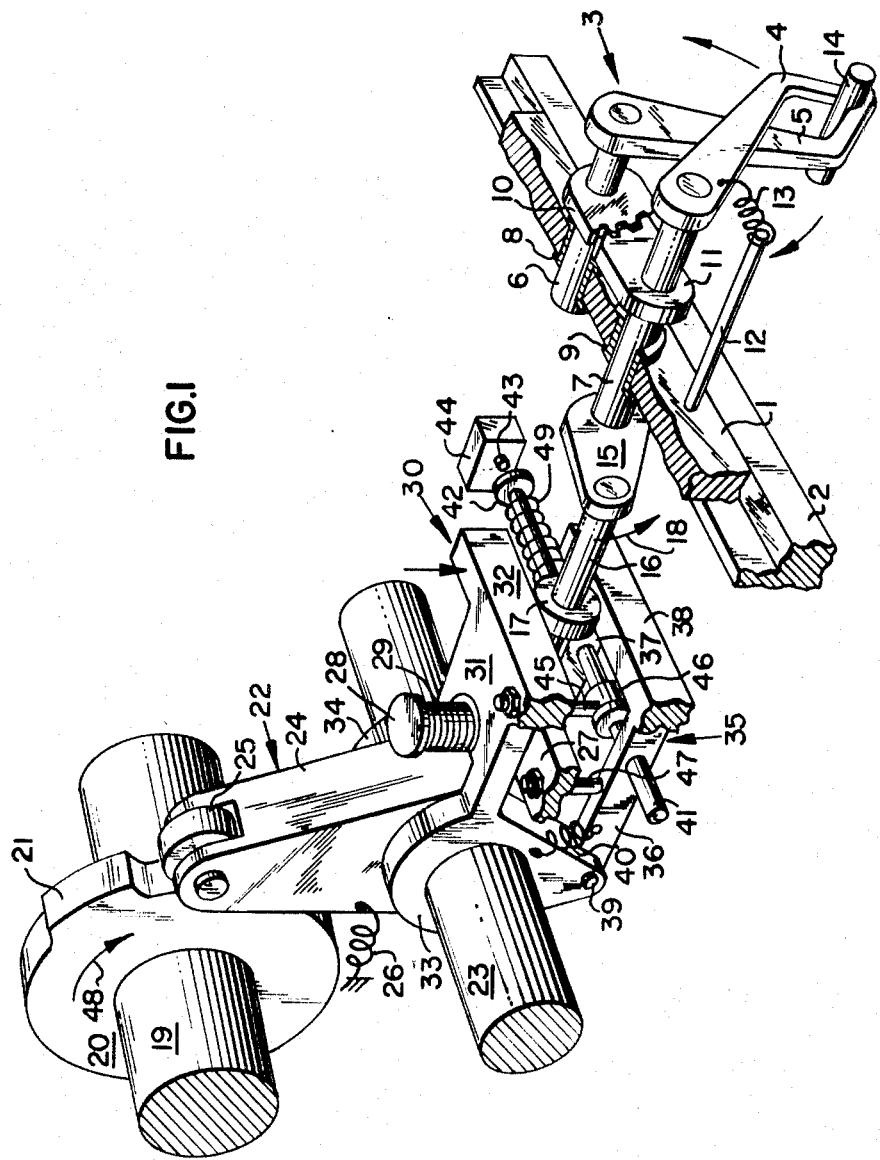
FIG. 1 shows in perspective, schematic presentation, a part view of the pincer device of a transverse transport multistage die press.

The pincer device of a multistage die press presented in part view in FIG. 1, includes a sliding carriage 1 which executes a reciprocatory movement on a sliding rest 2. The carriage 1 runs on an L-shaped ground upper face of the guide track 2. Two cooperating pincer arms 4 and 5 are each rigidly at their upper ends fixed to shafts 6 and 7 respectively and form a transverse transport gripper 3. The shafts 6 and 7 are freely rotatably mounted on the pincer carriage 1 in bushes 8 and 9 and are coupled together by gear-toothed segments 10 and 11 respectively. The toothed segments 10 and 11, permanently in mesh, are rigidly fixed to the relevant shafts, so that simultaneous movement of the two pincer arms is ensured.

A helical tension spring 13 extending between one pincer arm 4 and a rod 12 secured to the carriage 1 keeps the pincer arms 4 and 5 biased towards the closed condition. In FIG. 1 the gripper 3 is shown in the closed position and gripping a moulded article 14.

The shaft 7, which forms the drive shaft for the gripper 3, carries a crank 15 at its end remote from the pincer structure. The crank 15 is in turn connected to a spindle 16 carrying a roller 17. When the crank 15 is rotated in the direction of arrow 18 by means of the spindle 16, the shafts 6 and 7 and their respective pincer arms are rotated to a position in which the moulded article 14 is released.

A cam disc 20 is keyed on a continuously driven wheel shaft 19 and has, on its circumference, a cam surface a lobe 21 of which surface is hereinafter called the "opening lobe." The cam disc 20 cooperates with a cam-follower bell crank 22 fixedly secured on a freely rotating shaft 23, and one arm 24 of the bell crank extending towards the cam disc 20, and carrying a freely rotatable cam-follower roller 25. The roller 25 is maintained in contact with the cam surface of disc 20 by means of a tension spring 26 fastened to the press frame (not shown).

Figure 2:
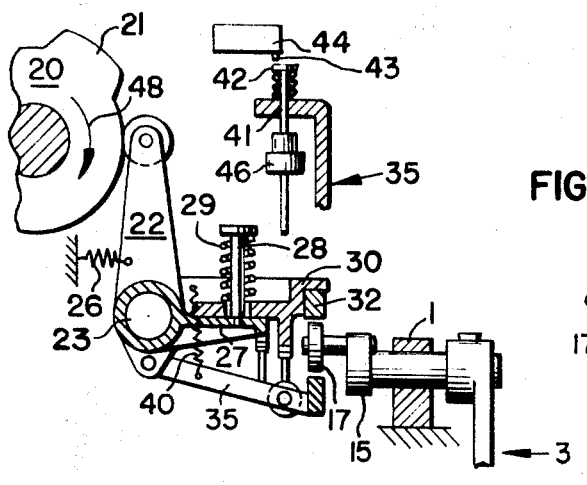
FIG. 2 shows a simplified sectional view of the pincer device according to FIG. 1, in the normal closed position of the pincer.
Figure 3:
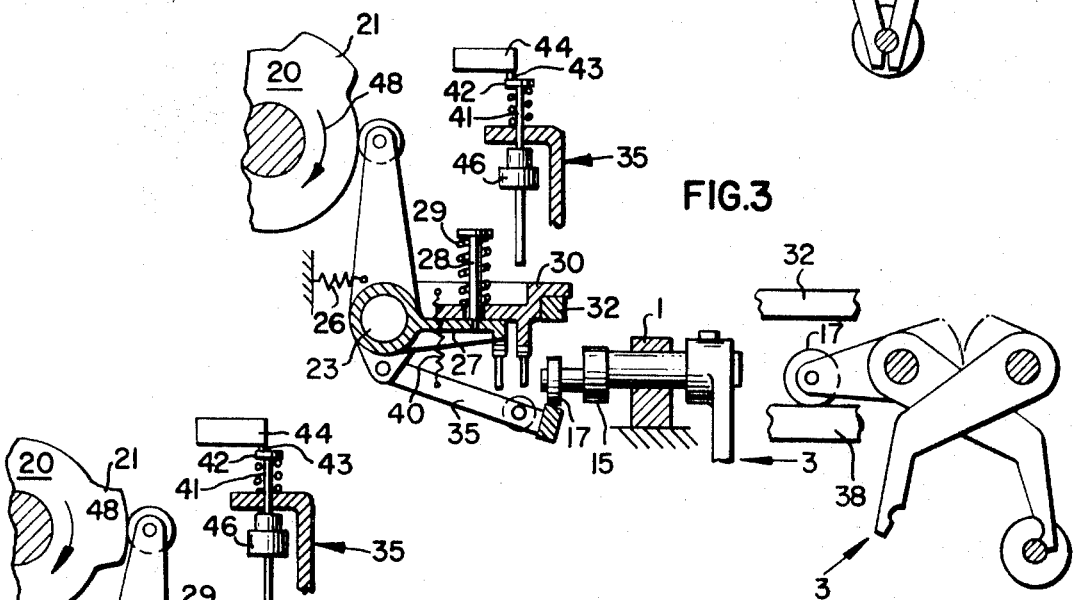
FIG. 3 shows a sectional view similar to FIG. 2 but in a position conditioned by a first obstruction.
Figure 4:
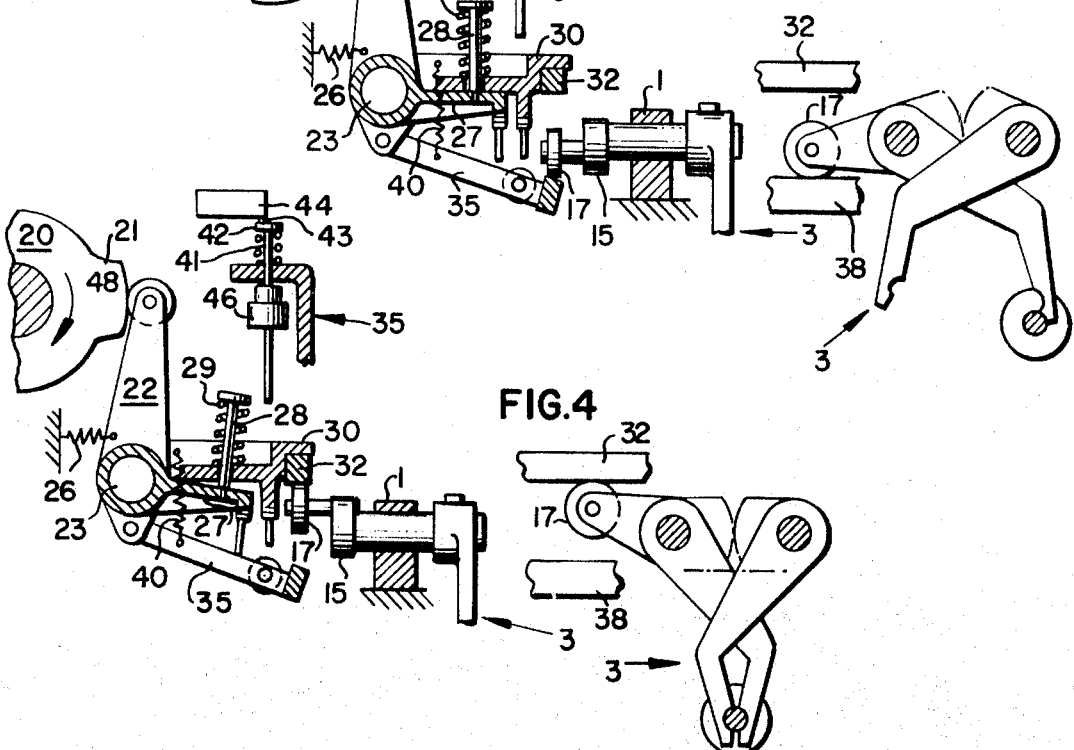
FIG. 4 shows a sectional view similar to FIG. 2 but in a position conditioned by a further obstruction.

The bell crank arm 27 nearest the pincer structure is clearly visible in FIG. 2 to 4. As can be easily envisaged from FIG. 1, this arm 27 could easily be mounted with its free end above the roller 17 so that as the cam-follower roller runs up the opening lobe 21, the bell crank would be pivoted in a clockwise direction, which would in turn cause pivoting of the crank 15 in the direction of arrow 18, thereby opening the pincer arms 4 and 5. However as soon as the pincer arms resist such opening movement for example because of an obstruction, the positive-driving connection would cause at least one of the transmission elements to be fractured. For this reason, the arm 27 of the bell crank is resiliently connected to an actuating member 30 by means of a coil spring 29 with the help of a pin 28 (see FIG. 2). The actuating member 30 is essentially a plate 31 whose free end is formed as a guide bar 32. The guide bar, as shown in FIG. 1, is a simple bar whose lower surface is in constant contact with the roller 17 when the pincers are open. The actuating member 30 includes two lugs 33 and 34 freely rotatably mounted on the shaft 23, one on either side of the pivot end of the arm 24. The helical compression spring 29 extends between the upper face of the actuating member 30 and the underside of a head of the pin 28. However the coil spring 29 may be replaced by any other resilient connection such as a plate spring box.

In normal operation of the pincer device the actuating member 30 and the bellcrank arm 27 are maintained in their normal angularly spaced configuration by the coil spring 29, and the force of the spring is so adjusted as to be sufficient to actuate the gripper 3 without relative angular movement between the arms 24 and 27. As soon as the resistance of the pincers to opening movement causes the roller 17 to overcome the downward force of the bar 32, the arm 27 of the bellcrank detaches itself from the actuating member 30 while the latter maintains its position. The pincer drive mechanism consequently has a resiliently yieldable link by means of which, in certain cases, damage can be avoided. However, as the press continues to operate subsequent complications may still result in many cases. In order that these also may be avoided with certainty, there has been developed the arrangement described below and also shown in FIG. 1.

A pivoting frame 35 comprising two parallel arms 36 and 37 has a transversely extending front piece 38 which is fixedly attached thereto and extends directly under the roller 17 over the length of the traverse path of the pincer along the rail 2. The parallel arms 36 and 37 are pivotally mounted on the underpart of the lugs 33 and 34 respectively by means of bolts 39. The frame 35 consequently forms a one-armed lever which can be rotated round the common longitudinal axis of the bolts 39. A helical coil spring 40 mounted on the lug 33 keeps the frame 35 as far as possible in its uppermost position parallel to the actuating member 30.

The parallel arms 36 and 37 have aligned holes in which a release rod 41 is freely slidably supported. The end of the release rod 41, lying on the right in FIG. 1, is provided with a disc 42 pointing towards an actuating knob 43 of a limit switch 44 in the electric power circuit to the press. This disc 42 serves as a spring plate for one end of a helical compression spring 49 concentrically arranged around the release rod 41 and braced at its other end against the opposing outside surface of the arm 37. Thus the spring 49 biases the release rod 41 to the right as viewed in FIG. 1, and in this way activates the switch 44. However, in normal operation of the pincer device the release rod 41 is prevented from doing this by the presence of a pin 45 mounted on the actuating member 30 and projecting downwards against the collar of a stepped bush 46 fixed on the release rod. The bush 46 thus holds the rod away from the switch 44 as long as the bush is in contact with pin 45.

A further pin 47 is mounted on the arm 27 of the bellcrank and protrudes downwards almost to the upper part of arm 36.

The operation of the safety device described above will now be explained with reference to FIGS. 2 to 4.

In FIG. 2, the pincer device is in its normal closed position. The roller 17 is urged towards the guide bar 32 by the closing spring 13 of the pincer, while the frame 35 under the influence of tension spring 40 is biased upwards to lie adjacent to the lower end face of pin 45. The activation of switch 44 is prevented by the intervention of the same pin 45 with the bush 46. As the cam disc 20 rotates in the direction of arrow 48, the opening lobe 21 will come in contact with the cam-follower roller 25 and will pivot the bellcrank 22 clockwise. The actuating member 30 will execute a similar clockwise pivoting movement and will entrain the frame 35. The pin 45 and bush 46 will remain engaged during the normal operation of the pincer device, so that no activating of switch 44 occurs.

In FIG. 3, the gripper 3, which in view of the angular position of the cam disc 20 should be in its closed position, has been forcibly opened by some hitch.

Corresponding to this pincer position the roller 17 has moved downwards for a certain distance and has pivoted the frame 35 round its rotating axis (bolt 39). However, the arm 27 of the bellcrank and the associated actuating member 30 did not take part in this movement, since the bellcrank is pivoted only under the influence of the opening lobe 21. Because of this relative movement between the actuating member 30 and the frame 35, the release rod 41 is freed and allowed to contact the switch knob 43 to stop the machine.

The reaction of the safety device to the second obstruction is presented in FIG. 4. The closed gripper 3 should have been opened by the opening lobe 21 but encounters a resistance. As the bellcrank 22 is forcibly pivoted by the opening lobe 21, the bellcrank arm 27 moves downwards round the shaft 23. The actuating member 30 resiliently linked to arm 27 is prevented from so moving by the action of the guide bar 32 resting on the jammed roller 17. The arm 27 and the actuating member 30 are consequently forced apart as shown in FIG. 4, and the arm 27 in its pivoting movement presses on the frame 35 by means of the pin 47 and entrains the frame for pivotal movement away from the actuating member 30. This relative pivotal movement between the actuating member 30 and the frame 35 serves to free the release rod 41 and to actuate the switch 44.

After operation of the switch 44, the release rod 41 may be reset by hand in its previous position and secured by the pin 45. It would also be possible to effect an automatic return and securing of rod 41 by known methods.

As the pin 45 should contact stepped bush 46, and the pin 47 should be as near as possible to the surface of arm 36 the pins 45 and 47 are best constructed so as to be longitudinally adjustable, this being achieved in the simplest way by adjustably screwing them into the arm 27 and guide bar 32, respectively. As indicated in FIGS. 2 to 4, the two pins 45 and 47 may be screwed in from below into holes in the components 27 and 32 respectively and secured in position by means of a nut and locknut.

The device operates normally only while the frame 35 follows the periodic pivoting movement of the bellcrank 22 so that the pin 45 and bush 46 in normal operation remain mutually engaged. However, it is not absolutely necessary for the arms 36 and 37 to be linked with the actuating member 30 since their pivot axis could easily be fixed on the bellcrank itself.

With appropriate positioning and construction of the crank 15 the roller 17 could be mounted directly thereon.

Finally, it would also be possible to replace the release mechanism consisting of the components 41 to 46 by a so-called proximity switch. Such a switch, fixed on to actuating member 30 or frame 35, would then react each time to relative movement between the components 30 and 35 and serve to stop the machine.

I claim:

1. A safety device comprising an actuating lever means, a handle member movable by said lever means, a drive means for imparting movement to said actuating lever means and thereby to impart reciprocating motion to said handle means, said actuating lever means including opposing first and second legs each pivoted about one end thereof for yielding motion when said handle member resists said reciprocating movement, said handle member being located between about distal ends of said first leg and said second leg, said actuating lever means further including an intermediate lever means for receiving said movement from said drive means for imparting said reciprocating movement to each of said pivoted first leg and said pivoted second leg, said actuating lever means further including a spring means for said first and second legs each respectively to receive and follow said reciprocating motion whenever said handle member is movable thereby to receive said reciprocating movement from said actuating lever means, said first leg contacting one side of said handle member imparting movement in one direction and said second leg contacting an opposite side of said handle member imparting movement in an opposite direction of said reciprocating movement, a switch means for energizing and for deenergizing said drive means, and a release to cause said switch means to deenergize said drive means when said handle member resists said reciprocating movement.

2. A safety device for supervising the movements of workpiece transport grippers on multistage die presses, comprising two gripper arms, a driving shaft, a crank arm, a control element, a resiliently yielding element, a first angle lever having a leg, a cam plate, a second lever, an elastic means, a release element, and a switching means, said two gripper arms being positively coupled for reciprocating movements alternately toward and away from each other, at least one of said gripper arms being rigidly connected with said driving shaft which by means of said crank arm is connected with said control element, said control element being connected by means of said resiliently yielding element with said leg of said first angle lever controlled by said cam plate, said second lever in normal operation of said presses participating in the periodic motion of said control element, said second lever being pivotally connected to at least one of said control elements and said first angle lever and under the influence of an elastic means so that said second lever is permanently urged against said leg of said first angle lever, said release element being arranged at one of the elements selected from said second lever and said control element, which in response to a relative movement between said control element and said second lever acts upon said switching means controlling activation of said angle lever.

3. A safety device according to claim 2, further including an axis of said first lever, a spring member, a release rod, and a release pin, and wherein said control element is an arm pivotally mounted on said axis and resiliently connected with said leg of said first angle lever through at least said spring member, said second lever forming a frame in which said release rod is arranged in an axially displaceable condition, said release rod being on the one hand under the influence of said resilient means, on the other hand, under normal operation conditions, in engagement with a release pin secured to said control element, whereby the release rod is disengaged in case of a relative movement between said control element and said second lever and pushed by said resilient means against a switch member.

4. A safety device according to claim 3, further including a bush member and a release rod, and wherein said release pin has a shape of a downwardly projecting, longitudinally adjustable pin of which a lower end thereof during normal operation of said presses engages said bush member mounted on said release rod.

5. A safety device according to claim 4, wherein the second lever's terminal section extends to close under the crank arm of the drive shaft or an extension thereof.

6. A safety device according to claim 4, further including a pressure finger, and wherein said pressure finger extends from the arm of the first angle lever to close to the surface of the second lever.

7. A safety device according to claim 6, wherein the pressure finger is longitudinally adjustable.